United States Patent [19]

Chinomi et al.

[11] Patent Number: 4,919,486

[45] Date of Patent: Apr. 24, 1990

[54] VEHICULAR SEAT

[75] Inventors: Isamu Chinomi; Yuji Tanaka, both of Kanagawa, Japan

[73] Assignee: Ikeda Bussan Co., Ltd., Ayase, Japan

[21] Appl. No.: 340,683

[22] Filed: Apr. 20, 1989

[30] Foreign Application Priority Data

Sep. 24, 1988 [JP] Japan .................... 63-125012 [U]

[51] Int. Cl.5 .............................................. A47C 7/00
[52] U.S. Cl. ..................... 297/443; 297/354; 297/355
[58] Field of Search ............... 297/443, 452, 354, 355; 403/353; 248/916.1, 222.2, 222.1

[56] References Cited

U.S. PATENT DOCUMENTS

| 2,423,816 | 7/1947 | Renkes | 297/443 X |
| 3,312,443 | 4/1967 | Levigne | 403/353 X |
| 3,398,981 | 8/1968 | Vincens | 248/222.1 |
| 4,441,619 | 4/1984 | Gibitz | 248/222.1 |
| 4,592,672 | 6/1986 | Ruch, Jr. | 403/353 X |

FOREIGN PATENT DOCUMENTS

| 0037097 | 3/1981 | European Pat. Off. . |
| 1301503 | 12/1972 | United Kingdom . |
| 1514916 | 6/1978 | United Kingdom . |
| 2075113 | 11/1981 | United Kingdom . |

Primary Examiner—James T. McCall
Attorney, Agent, or Firm—Foley & Lardner, Schwartz, Jeffery, Schwaab, Mack, Blumenthal & Evans

[57] ABSTRACT

Herein disclosed is a vehicular seat which comprises a rectangular seatback frame; a side plate secured to one side lower portion of the seatback frame; a reclining device having a pivotal arm; two sets of bolts and nuts for detachably connecting the side plate and the pivotal arm; a hook member defined by one of the side plate and the pivotal arm; and a catch structure defined by the other of the side plate and the pivotal arm. The hook member is latchingly and detachably engaged with the catch structure when the side plate is secured to the pivotal arm by means of the bolts and nuts.

3 Claims, 3 Drawing Sheets

VEHICULAR SEAT

BACKGROUND OF THE INVENTION

1. Field of the Invention

The present invention relates in general to vehicular seats, and more particularly, to vehicular seats of a reclining type which generally comprises a seat cushion part, a seatback part and a reclining device by which the seatback part is pivotal to a desired angular locked position relative to the seat cushion part.

2. Description of the Prior Art

In order to clarify the task of the present invention, one conventional vehicular seat will be outlined with reference to FIGS. 5 and 6 of the accompanying drawings.

FIG. 5 shows, but partially, a framework of the conventional vehicular seat, which comprise a rectangular seatback frame 1 and side plates 2 secured to respective side lower portions of the seatback frame 1. Designated by numeral 3 is a known reclining device which has a base plate 4 from which a pivotal arm 5 extends. The pivotal arm 5 is securely bolted at its upper portion 5a to a lower portion 2a of one of the side plates 2. For this bolt connection, two bolts 6a and 6b are used, each passing through an opening 8a or 8b of the pivot arm 5 and another opening 7a or 7b of the side plate 2 and engaging with a nut 9a or 9b. Although not shown in the drawing, the reclining device 3 is tightly mounted to one side of a seat cushion frame, and a known pivot mechanism is arranged at the other side of the seat cushion frame to achieve a pivotal connection of the seatback frame 1 relative to the seat cushion frame.

However, due to its inherent construction, the above-mentioned vehicular seat has the following drawback which appears particularly when the seat is being assembled.

That is, the work for connecting the seatback frame 1 to the pivotal arm 5 has been difficult or at least troublesome. That is, for the purpose of bolting the seatback frame 1 to the reclining device 3, a first bolt 6a or 6b is, at first, manipulated to pass through the mated openings 8a and 7a (or, 8b and 7b) of the pivotal arm 5 and side plate 2 and temporarily engaged with a corresponding nut 9a or 9b. This work is carried out having the other openings 5b and 7b (or, 5a and 7a) kept mated.

Then, with the seatback frame 1 supported by an operator's hand, a second bolt 6b or 6a is manipulated to pass through the other mated openings 8b and 7b (or, 8a and 7a) and engaged with the other nut 9b or 9a.

However, if the engaging manipulation of the second bolt is intended without the aid of the operator's hand, the seatback frame 1 tends to make a sudden pivoting (in forward or rearward direction) about the temporarily engaged first bolt 6a, by its own weight, breaking the one-point connection between the first bolt 6a and nut 9a, as will be seen from FIG. 6. This sudden pivoting is very dangerous.

SUMMARY OF THE INVENTION

It is therefore an object of the present invention to provide a vehicular seat which is free of the above-mentioned drawback.

According to the present invention, there is provided a vehicular seat which is equipped, at a side plate of the seatback frame and a pivotal arm of the reclining device, with a so-called self-supporting structure by which the above-mentioned dangerous pivoting of the seatback frame is suppressed.

According to the present invention, there is provided a vehicular seat which comprises a rectangular seatback frame; a side plate secured to one side lower portion of the seatback frame; a reclining device having a pivotal arm; connecting means for detachably connecting the side plate and the pivotal arm; a hook member defined by one of the side plate and the pivotal arm; and a catch structure defined by the other of the side plate and the pivotal arm, wherein the hook member is latchingly and detachably engaged with the catch structure when the side plate is secured to the pivotal arm by means of the connecting means.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
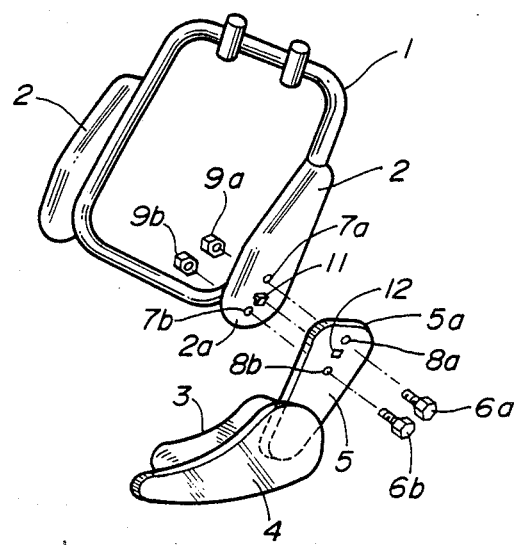
FIG. 1 is an exploded, but partial, view of a framework of vehicular seat which is a first embodiment of the present invention.
Figure 2:
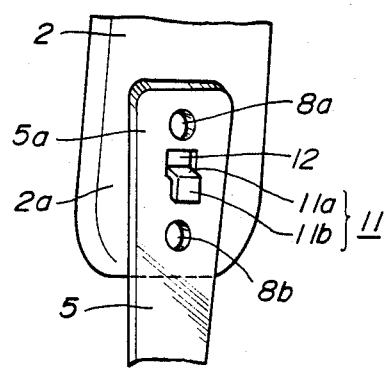
FIG. 2 is an enlarged perspective view of an essential portion of the framework of the first embodiment, where a so-called self-supporting structure is provided.

Referring to FIGS. 1 and 2, there is shown a first embodiment of the present invention.

For ease of description, the same parts as those of the afore-mentioned conventional seat are denoted by the same numerals and detailed description of them will be omitted from the following.

The framework of the seat of the first embodiment comprises a rectangular seatback frame 1 and side plates 2 secured to respective side lower portions of the seatback frame 1. A known reclining device 3 is attached to one side of a seat cushion frame, which has a base plate 4 from which a pivotal arm 5 extends. The pivotal arm 5 is securely connected at its upper portion 5a to a lower portion 2a of the side plate by means of two sets of bolts 6a and 6b and nuts 9a and 9b, like in the case of the above-mentioned conventional seat.

In the first embodiment of the invention, however, the following measure is further employed.

As is seen from FIG. 2, the side plate 2 has between the two openings 7a and 7b a hook member 11 raised therefrom, and the pivotal arm 5 has between the two openings 8a and 8b a rectangular opening 12 formed therethrough. Upon assembly, the hook member 11 is latchingly engaged with the rectangular opening 12 as will become apparent as the description proceeds.

The hook member 11 has a generally L-shaped cross section, which comprises a base portion 11a raised perpendicular from the side plate 2, and a top portion 11b extending perpendicularly from a top of the base portion 11a. Thus, upon assembly, the base portion 11a fits in the rectangular opening 12, and the top portion 11b projects from the opening 12 and contacts with an outer surface of the pivotal arm 5, as is shown in FIG. 2.

In order to assemble the seat of the first embodiment, the following steps are taken.

First, the side plate 2 is brought to the pivotal arm 5 having the hook member 11 inserted through the rectangular opening 12 of the arm 5, and then a first bolt 6a or 6b is manipulated to pass through the mated openings 8a and 7a (or, 8b and 7b) of the pivotal arm 5 and side plate 2 and engaged with a corresponding nut 9a or 9b.

It is now to be noted that, under this condition, the seatback frame 1 is unmovably supported on the pivotal arm 5 due to presence of so-called "two-points connection" which is achieved by both one engagement between the hook member 11 and the rectangular opening 12 and the other engagement between the first bolt 6a or 6b and the corresponding nut 9a or 9b.

Then, a second bolt 6b or 6a is manipulated to pass through the other mated openings 8b and 7b (or, 8a and 7a) and engaged with the other nut 9b or 9a. It is to be noted that, due to presence of the two-points connection as mentioned hereinabove, the engaging manipulation of the second bolt can be carried out without the aid of the operator's hand, unlike the case of the aforementioned conventional seat. That is, the dangerous pivoting of the seatback frame 1 during the assembling work is suppressed.

Figure 3:
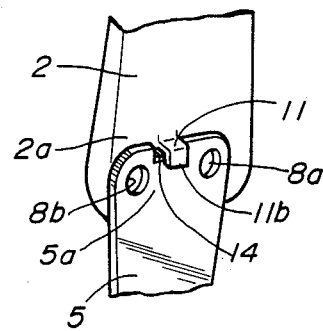
FIG. 3 is a view similar to FIG. 2, but showing a second embodiment of the present invention.

Referring to FIG. 3, there is shown a second embodiment of the present invention.

In this embodiment, a rectangular recess 14 is formed at an upper end of the pivotal arm 5 as a substitute for the rectangular opening 12 of the first embodiment. That is, the two-points connection is achieved by one engagement between a first bolt and a corresponding nut and the other engagement between the hook member 11 and the rectangular recess 14. Thus, the same advantage as that of the first embodiment is given in this second embodiment.

Figure 4:
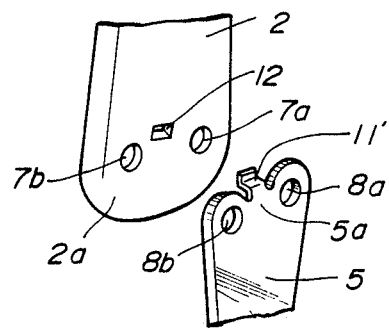
FIG. 4 is a view also similar to FIG. 2, but showing a third embodiment.
Figure 5:
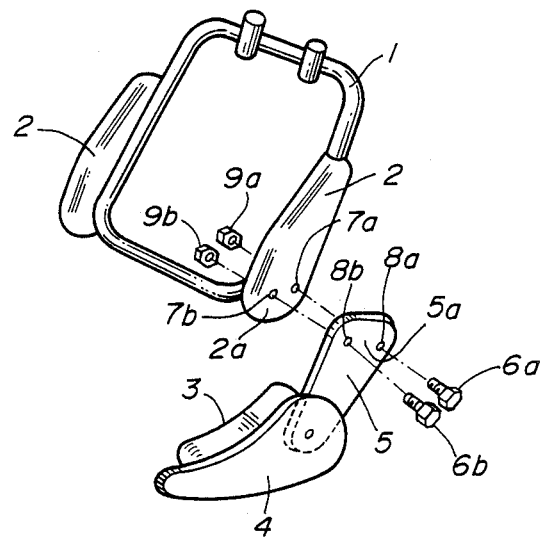
FIG. 5 is a view similar to FIG. 1, but showing a framework of a conventional vehicular seat.
Figure 6:
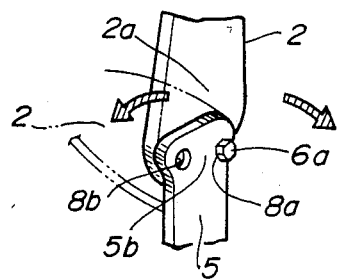
FIG. 6 is a view similar to FIG. 2, but showing the conventional framework.

Referring to FIG. 4, there is shown a third embodiment of the present invention.

In this third embodiment, the rectangular opening 12 is formed in the side plate 2, and the hook member 11′ to be engaged with the opening 12 is formed on the pivotal arm 5.

As will be understood from the foregoing description, in accordance with the present invention, the dangerous sudden pivoting of the seatback frame during the seat assembling work is suppressed. Furthermore, due to the engagement between the hook member 11 or 11′ and the hook receiving opening 12 or recess 14, the relative positioning between the side plate 2 and the pivotal arm 5 is easily achieved before and for the bolt connection. These facilitate the assembling process of the seat.

What is claimed is:

1. A vehicular seat comprising:
   a rectangular seatback frame;
   a side plate secured to one side lower portion of the seatback frame;
   a hook member integral with and raised from said side plate;
   a reclining device having a pivotal arm;
   first means defining at a leading free end of said pivotal arm a rectangular recess, said rectangular recess being so sized and constructed as to make a latching engagement with said hook member;
   second means defining in said side plate and said pivotal arm first and second pairs of mated openings;
   first and second bolts passing through said first and second pairs of mated openings respectively; and
   first and second nuts operatively engaged with said first and second bolts respectively;
   wherein said rectangular recess is above said openings of said pivotal arm in the direction to said leading free end of said pivotal arm.

2. A vehicular seat as claimed in claim 1, in which said hook member is constructed to have a generally L-shaped cross section.

3. A vehicular seal as claimed in claim 1, wherein said rectangular recess is positioned at a distance from an imaginary line passing through the openings of said pivotal arm.

* * * * *